United States Patent [19]

Yaotani et al.

[11] 4,399,927
[45] Aug. 23, 1983

[54] SNAP-ON PLUG

[75] Inventors: Kouichi Yaotani, Akikawa; Minoru Yoshida, Hachioji; Oomi Arisaka, Yokohama, all of Japan

[73] Assignee: Nissan Motor Company, Limited, Yokohama, Japan

[21] Appl. No.: 265,363

[22] Filed: May 20, 1981

[30] Foreign Application Priority Data

May 21, 1980 [JP] Japan .................. 55-68907[U]

[51] Int. Cl.$^3$ .............................................. B65D 39/00
[52] U.S. Cl. ............................. 220/307; 220/DIG. 19
[58] Field of Search .......................... 220/307, DIG. 19

[56] References Cited

U.S. PATENT DOCUMENTS 3,982,649 9/1976 Wanderer ........................... 220/307
4,290,536 9/1981 Morel ............................ 220/DIG. 19
4,334,632 6/1982 Watanare ........................... 220/307

Primary Examiner—George T. Hall
Attorney, Agent, or Firm—Schwartz, Jeffery, Schwaab, Mack, Blumenthal & Koch

[57] ABSTRACT

In accordance with the present invention, there is provided a novel and improved snap-on plug for an apertured panel. The snap-on plug comprises a shank and a flange extending laterally from one end of the shank. The shank is hollow and adapted for insertion within a complementary panel aperture. A groove is formed in the outer surface of the shank at a location adjacent the flange and adapted for engagement with a panel portion around the aperture. The shank is provided with an inner surface portion upon which a force is applied when the plug is to be inserted into the panel aperture. The inner surface is inclined with respect a plane in which the groove is positioned such that upon insertion of the plug into the complementary panel aperture the groove is gradually brought into engagement with the panel.

9 Claims, 17 Drawing Figures

SNAP-ON PLUG

BACKGROUND OF THE INVENTION

1. Field of the Invention

The present invention relates in general to a plug for closing up a hole or aperture in a panel and more particularly to a plug of the snap-on type.

2. Description of the Prior Art

This kind plug is used in case where a panel aperture such as an access hole or a drain hole needs to be closed up after use. The plug is made of a resilient material and adapted to be inserted into a complementary panel aperture by hand pressing. In this connection, when the plug is made of a relatively soft resilient material, it is insertable with ease but prone to be slipped off. On the other hand, when the plug is made of a relatively hard resilient material, it can be assuredly retained in position but its insertion cannot be attained with ease. The prior art snap-on plug encounters such a dilemma described as above.

SUMMARY OF THE INVENTION

In accordance with the present invention, there is provided a novel and improved snap-on plug which comprises a shank and a flange extending laterally from one end of the shank. The shank is hollow and adapted for insertion within a complementary panel aperture. A groove is formed in the outer surface of the shank at a location adjacent the flange and adapted for engagement with the panel. The shank is provided with an inner surface portion upon which a force is applied when the plug is to be inserted into the panel aperture. The inner surface portion is inclined with respect to a plane in which the groove is positioned such that upon insertion of the plug into the panel aperture the groove is gradually brought into engagement with the panel. With the above structure, the snap-on plug of the present invention can be made of a harder resilient material as compared with a comparable prior art plug without sacrificing easiness in mounting.

It is accordingly an object of the present invention to provide a novel and improved snap-on plug for an apertured panel which can effect easy mounting as well as assured retention.

BRIEF DESCRIPTION OF THE DRAWINGS

The features and advantages of the snap-on plug according to the present invention will become more clearly appreciated from the following description taken in conjunction with the accompanying drawings in which similar parts are designated by similar numerals and in which.

DESCRIPTION OF THE PREFERRED EMBODIMENTS

Figure 1:
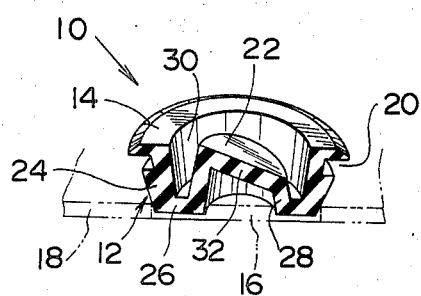
FIGS. 1 to 4 are partly sectional, perspective views of snap-on plugs according to first, second, third and fourth embodiments of the present invention.

Referring first to FIG. 1, a snap-on plug 10 according to a first embodiment of the present invention comprises a shank 12 and a flange 14 extending laterally from one end of the shank. The shank 12 is hollow and adapted for insertion within a complementary aperture 16 of a panel 18. A groove 20 is formed in the outer surface of the shank 12 at a location adjacent the flange 14 and adapted for engagement with the panel portion 18 around the panel aperture 16. The shank 12 has an inner surface portion 22 upon which a force is applied when the plug 10 is to be inserted into the panel aperture 16. In this instance, it should be noted that the inner surface portion 22 is inclined with respect to a plane in which the groove 20 is positioned, for the reason as will be understood as the description proceeds.

More specifically, the shank 12 is formed from an outer tubular wall portion 24, an annular bottom wall portion 26 extending laterally inward from an end of the outer tubular wall portion 24 opposite the flange 14, an inner tubular wall portion 28 extending axially inward of the outer tubular wall portion 24 from the inner periphery of the bottom wall portion 26 and forming an annular space 30 between the outer and inner tubular wall portions, and a top wall portion 32 closing an end of the inner tubular wall portion 28 remote from the bottom wall portion 26. The foregoing flange 14 is provided to the outer tubular wall portion 24 in a manner to extend laterally outward from one end of the outer tubular wall portion. The groove 20 has a circular configuration and formed in the outer surface of the outer tubular wall portion 24. The outer surface of the outer tubular wall portion 24 is generally smooth and tapers slightly in order to facilitate insertion of the shank 12 into the complementary panel aperture 16. The foregoing inclined inner surface portion 22 of the shank 16 is provided to the top wall portion 32 which, in this embodiment, has a substantially uniform thickness and is inclined with respect to a plane in which the groove 20 is positioned. The inner surface portion 22 in this embodiment is formed as a substantially flat or planer surface. The snap-on plug 10 is formed from a single piece of a relatively hard resilient material.

With additional reference to FIGS. 9(a) to 9(e), description will be further made to a way of inserting the plug 10 into the complementary panel aperture 16.

Figure 9A:
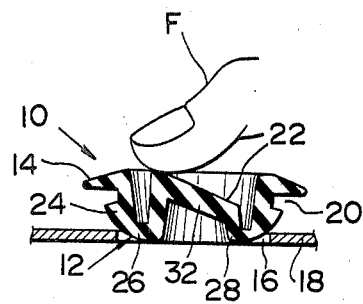
FIGS. 9(a) to 9(e) are views showing a way of inserting the snap-on plug of FIG. 1 into a complementary panel aperture.
Figure 9B:
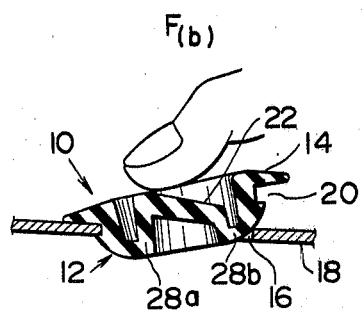
Figure 9C:
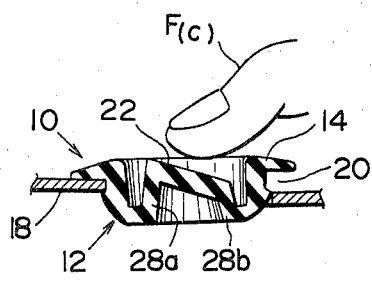
Figure 9D:
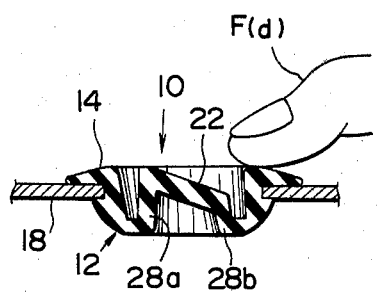
Figure 9E:
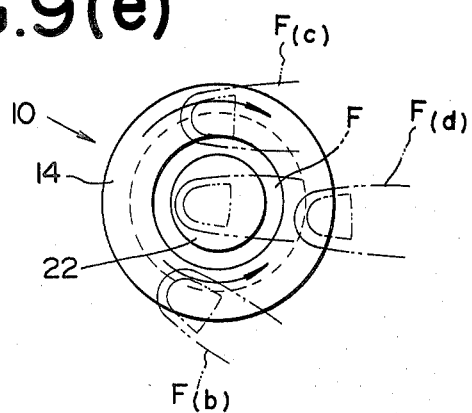

As shown in FIG. 9(a), the snap-on plug 10 is first aligned at the bottom wall portion 26 thereof with the complementary panel aperture 16. The plug 10 is then pushed toward the panel aperture 16 by applying a force upon the inclined inner surface portion 22 with a finger F. In this instance, due to the inclination of the top wall portion 32 or the inclined inner surface portion 22, a relatively larger stress results in the axially longer part 28a of the inner tubular wall portion 28 while a relatively smaller stress results in the axially shorter part 28b of the inner tubular wall portion. By this, the closer part of the outer tubular wall portion 24 with respect to the axially longer part 28a of the inner tubular wall portion 28 is first moved into the panel aperture 16 prior to the remoter part of same, causing the plug 10 to be inclined as shown in FIG. 9(b). The groove 20 is thus allowed to partially engage the corresponding panel portion. The finger F is then placed on the flange 14 at a position thereof as indicated at F(b) and F(c) in FIG. 9(e) to push thereat the flange against the panel 18 and then moved into another position on the flange in the direction as indicated by the arrows in FIG. 9(e) to push thereat the flange. In this manner, the groove 20 is gradually brought into engagement with the panel 18 and eventually, when the finger pushes the flange 14 at F(d), the plug 10 is mounted in position as shown in FIG. 9(d).

In the foregoing, the amount of force required at each mounting process is substantially equalized and relatively small according to the present invention since the plug 10 is constructed so that all part of the groove 20 is not brought into engagement with the panel at the same time and that the groove is gradually brought into engagement with the panel. Accordingly, the snap-on plug of the present invention can be formed from a harder yet resilient material as compared with a prior art comparable plug without sacrificing easiness in mounting.

Figure 5:
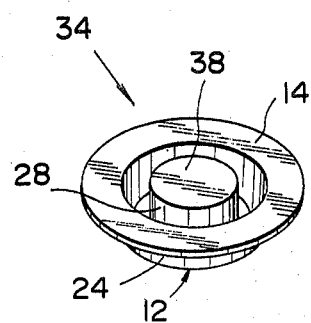
FIG. 5 is a perspective view of a defective example of a snap-on plug for indicating a main aspect of the present invention by comparison.
Figure 6:
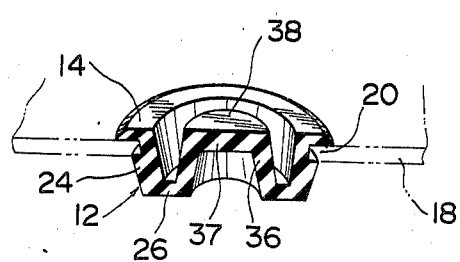
FIG. 6 is a partly sectional, perspective view of the snap-on plug of FIG. 5.
Figure 7:
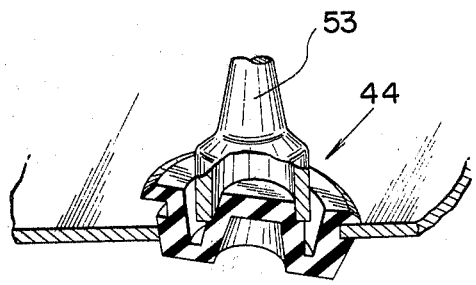
FIG. 7 is a partly sectional, perspective view of the snap-on plug of FIG. 3 or 4 in a state partly inserted into a complementary panel aperture by using a tool.

FIGS. 5 and 6 show a defective example wherein a snap-on plug 34 comprises an inner tubular wall portion 36 and a top wall portion 37 adapted to form an inner surface portion 38 which is substantially parallel to a plane in which a groove 20 is positioned. The plug 34 is constructed so that all part of the groove 20 is brought into engagement with the panel 18 at the same time. When the plug 34 is made of a relatively hard resilient material, its insertion into a complementary panel aperture 16 cannot be attained with ease. On the other hand, when the plug 34 is made of a relatively soft resilient material, it is prone to be slipped off. That is, when the plug made of a relatively soft resilient material is mounted in an aperture of a floor panel of a vehicle, the plug is prone to be removed or slipped off by a pebble which is thrown up by the running vehicle to strike the plug.

Figure 2:
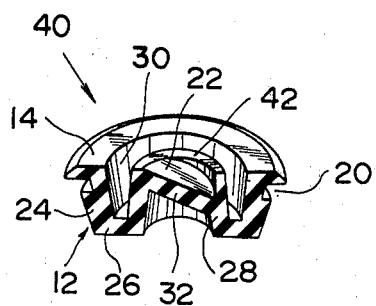

Referring to FIG. 2, a snap-on plug 40 according to a second embodiment of the present invention is substantially similar to the first embodiment of FIG. 1 except that a part-cylindrical guide wall portion 42 in the form of an extension of an inner tubular wall portion 28 is provided to the periphery of a top wall portion 32. The guide wall portion 42 is provided for the purpose of preventing the slip of a round bar or the like tool which is used to push the top wall portion. The second embodiment can effect substantially the same effect as the first embodiment.

Figure 3:
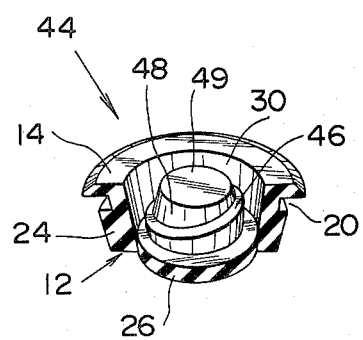

Referring to FIG. 3, a snap-on plug 44 according to a third embodiment of the present invention is substantially similar to the first embodiment of FIG. 1 except that an inner surface portion 46 is provided to an inner tubular wall portion 48 and that a top wall portion 49 is substantially parallel to a plane in which a groove 20 is positioned. That is, the inner tubular wall portion 48 is formed with an annular shoulder 46 which is substantially flat or planer. The annular shoulder 46 forms the foregoing inner surface portion of the shank 12 and is inclined with respect to a plane in which a groove 20 is positioned.

Figure 10A:
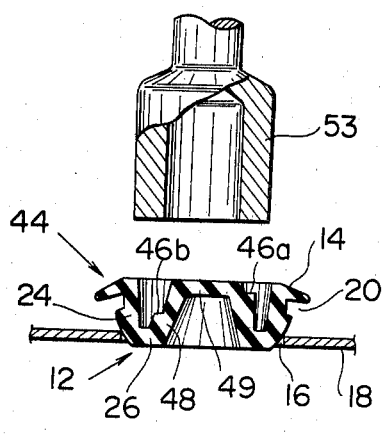
FIGS. 10(a) to 10(d) are views showing a way of inserting the snap-on plug of FIG. 3 into a complementary panel aperture.
Figure 10B:
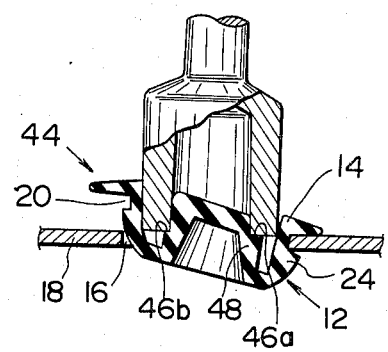
Figure 10C:
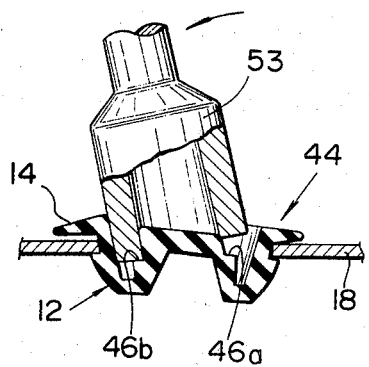
Figure 10D:
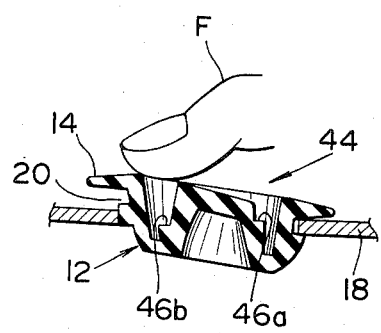

The snap-on plug 44 is inserted into a complementary aperture 16 by using a socket wrench 53 or the like tool as shown in FIG. 7 and FIGS. 10(a) to 10(d). That is, the plug 44 is first aligned at a bottom wall portion 26 with the panel aperture 16 as shown in FIG. 10(a). The plug is then pushed toward the panel aperture by applying a force on the shoulder 46 by using the socket wrench 53. In this instance, due to the inclination of the shoulder, the force is applied concentratively on the higher part 46a of the shoulder 46 than the lower part 46b of same. By this, the closer part of an outer tubular wall portion 24 with respect to the higher shoulder part 46a is first moved into the panel aperture 16 prior to the remoter part of same, causing the plug 44 to be inclined as shown in FIG. 10(b). Then, as shown in FIG. 10(c), a force is applied concentratively on the lower shoulder part 46b with the socket wrench 53 being inclined. Alternative to this, a flange 14 may be pushed with a finger F in a manner similar to the first embodiment, as shown in FIG. 10(d). In this manner, the groove 20 is gradually brought into engagement with the panel 18 and eventually the plug is mounted in position.

The third embodiment of FIG. 3 therefore can produce substantially the same effect as the first embodiment of FIG. 1.

Figure 4:
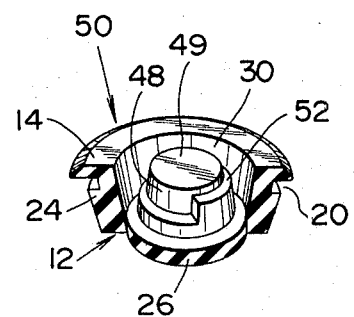

Referring to FIG. 4, a snap-on plug 50 according to a fourth embodiment of the present invention is substantially similar to the third embodiment of FIG. 3 except that a shoulder 52 which forms the foregoing inner surface portion of a shank 12 is in a spiral or helical form. This embodiment can be mounted in a complementary panel aperture 16 in a manner substantially similar to the third embodiment of FIG. 3 by using a socket wrench or the like tool and can produce substantially the same effect as the third embodiment.

Figure 8:
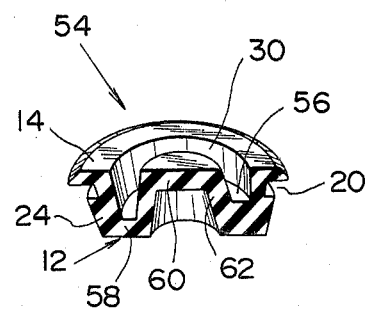
FIG. 8 is a partly sectional, perspective view of a snap-on plug according to a fifth embodiment of the present invention.

Referring to FIG. 8, a snap-on plug 54 according to a fifth embodiment of the present invention is substantially similar to the first embodiment of FIG. 1 except that an inner surface portion 56 is provided to a bottom wall portion 58 and that a top wall portion 60 which closes an end of an inner tubular wall portion 62 is substantially parallel to a plane in which a groove 20 is positioned. That is, the bottom wall portion 60 in this embodiment has an irregular thickness to form the inner surface portion 56 upon which a force is applied when the plug 54 is to be inserted into a complementary panel aperture 16. The inner surface portion 56 may be planar or in a spiral form so long as it is inclined with respect to a plane in which the groove 20 is positioned. This fifth embodiment of FIG. 8 can be mounted in the complementary panel aperture 16 in a manner substantially similar to the embodiment of FIG. 3 or 4 and can produce substantially the same effect as the previous embodiments.

Obviously, many variations and modifications of the present invention are possible in light of the above teachings. It is, therefore, to be understood that within the scope of the appended claims, the invention may be practiced otherwise than as specifically described.

What is claimed is:

1. A snap-on plug for an apertured panel, comprising:
    a hollow shank adapted for insertion within a panel aperture;
    a flange extending laterally from one end of said shank; and
    a groove formed in the outer surface of said shank at a location adjacent said flange and adapted for engagement with the panel;
    said shank having an inner surface portion upon which a force is applied when the plug is to be inserted into the panel aperture:

said inner surface portion being inclined with respect to a plane in which said groove is positioned.

2. A snap-on plug as set forth in claim 1, wherein said shank comprises an outer tubular portion from one end of which said flange extends laterally outward and which has said groove in the outer surface thereof, an annular bottom wall portion extending laterally inward from the other end of said outer tubular wall portion, an inner tubular wall portion extending axially inward of said outer tubular wall portion from the inner periphery of said bottom wall portion in a manner to form an annular space between the outer and inner tubular wall portions and a top wall portion closing an end of said inner tubular wall portion remoter from said bottom wall portion, and wherein said inclined inner surface portion is provided to said top wall portion.

3. A snap-on plug as set forth in claim 2, wherein said shank further comprises a part-cylindrical guide wall portion in the form of an extension of said inner tubular wall portion.

4. A snap-on plug as set forth in claim 1, wherein said shank comprises an outer tubular wall portion from one end of which said flange extends laterally outward and which has said groove in the outer surface thereof, an annular bottom wall portion extending laterally inward from the other end of said outer tubular wall portion, an inner tubular wall portion extending axially inward of said outer tubular wall portion from the inner periphery of said bottom wall portion in a manner to form an annular space between the outer and inner tubular wall portions and a top wall portion closing an end of said inner tubular wall portion remoter from said bottom wall portion, and wherein said inclined inner surface portion is provided to said inner tubular wall portion.

5. A snap-on plug as set forth in claim 4, wherein said inner tubular wall portion is provided with a shoulder which forms said inner surface portion.

6. A snap-on plug as set forth in claim 5, wherein said shoulder has a flat and annular configuration.

7. A snap-on plug as set forth in claim 5, wherein said shoulder is in a spiral form.

8. A snap-on plug as set forth in claim 1, wherein said shank comprises an outer tubular wall portion from one end of which said flange extends laterally outward and which has said groove in the outer surface thereof, an annular bottom wall portion extending laterally inward from the other end of said outer tubular wall portion, an inner tubular wall portion extending axially inward of said outer tubular wall portion from the inner periphery of said bottom wall portion in a manner to form an annular space between the outer and inner tubular wall portions, and a top wall portion closing an end of said inner tubular wall portion remoter from said bottom wall portion, and wherein said inclined inner surface portion is provided to said bottom wall portion.

9. A snap-on plug as set forth in claim 1, being formed from a single piece of a relatively hard resilient material.

* * * * *

UNITED STATES PATENT AND TRADEMARK OFFICE
CERTIFICATE OF CORRECTION

PATENT NO. : 4,399,927
DATED : August 23, 1983
INVENTOR(S) : Kouichi YAOTANI, Minoru YOSHIDA, and Oomi ARISAKA It is certified that error appears in the above-identified patent and that said Letters Patent is hereby corrected as shown below:

On the Title page, Assignee should read:

--NISSAN MOTOR CO., LTD.
  Yokohama
  JAPAN          and

KATO HATSUJO KAISHA LIMITED
Yokohama
JAPAN

Signed and Sealed this

Twenty-second Day of November 1983

[SEAL]

Attest:

GERALD J. MOSSINGHOFF

Attesting Officer    Commissioner of Patents and Trademarks